Feb. 3, 1953    H. A. SCHULTZ    2,627,584
STATOR MEMBER FOR DYNAMOELECTRIC MACHINES
Filed Oct. 5, 1951    2 SHEETS—SHEET 2
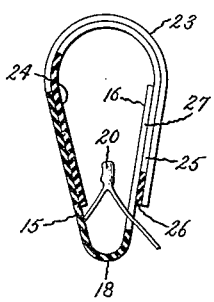
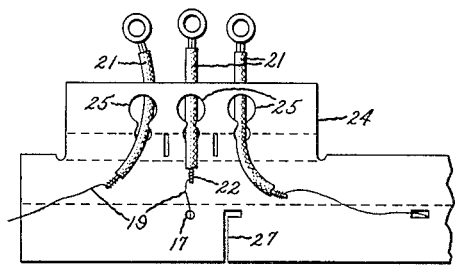
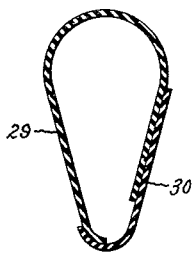
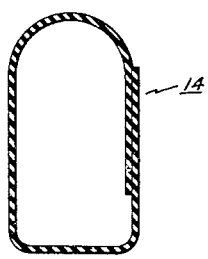
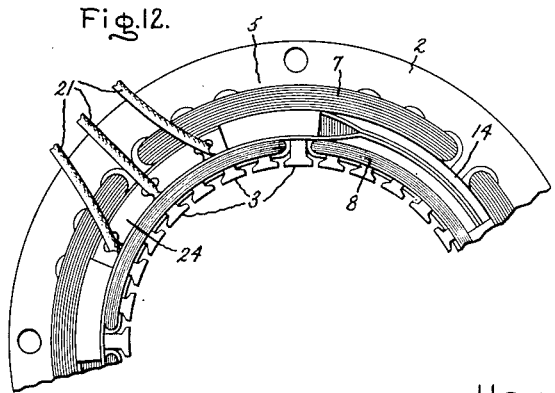
Inventor:
Howard A. Schultz,
by (signature)
His Attorney.

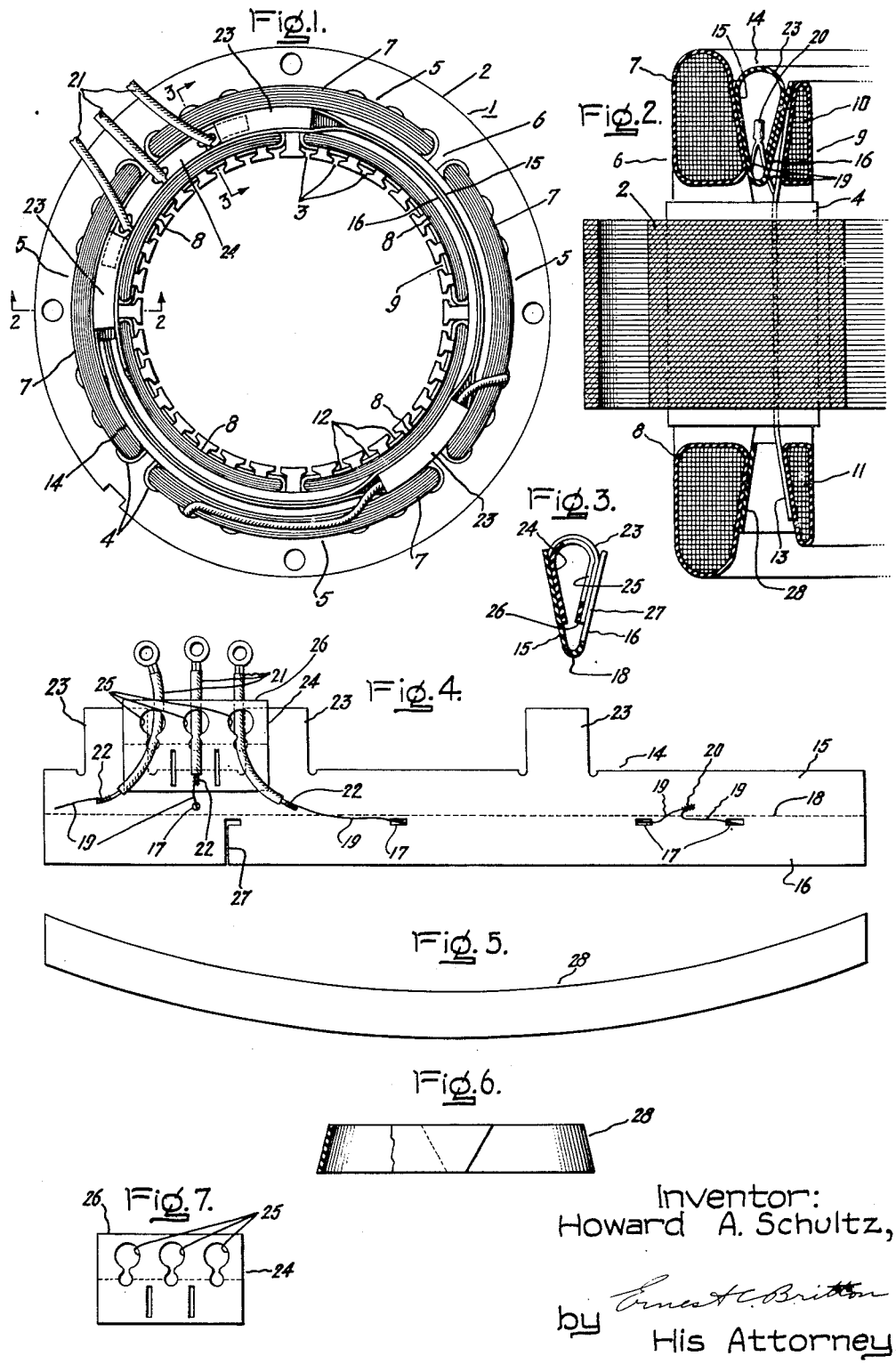

Patented Feb. 3, 1953

2,627,584

UNITED STATES PATENT OFFICE 2,627,584

STATOR MEMBER FOR DYNAMOELECTRIC MACHINES

Howard A. Schultz, Decatur, Ind., assignor to General Electric Company, a corporation of New York Application October 5, 1951, Serial No. 249,985

12 Claims. (Cl. 310—71)

This invention relates to stator members for dynamoelectric machines, and more particularly to stator members having a plurality of windings of the distributed type.

In the design of stator members for dynamoelectric machines having a plurality of windings arranged in winding slots in the stator core, such as fractional horsepower single phase alternating current motors having a running winding and a starting winding, the coils which comprise the running winding are conventionally positioned in the winding slots in the stator core and the coils comprising the starting winding are positioned in the same slots over the running winding coils. Since the starting and running winding coils occupy the same slots in the stator core and both have end turns projecting therefrom, it is necessary to separate the end turns of the running winding coils from the end turns of the starting winding coils in order to prevent shorts between the two windings. It is further necessary to protect and insulate the connections between the poles and the external lead connections. In the past, a number of different pieces of insulation were required to satisfactorily furnish this protection, for example, a plurality of pieces of insulating material to separate the running and starting winding end turns, other pieces of insulating material to insulate the lead connections and connections between poles, still other pieces to protect the connections between starting winding coils, and finally, insulating stockinettes to cover lead wires and connection wires to reduce the possibility of shorts therebetween. This method of insulating end turns, between coil connections and external lead connections has been unduly expensive because of the time-consuming labor required for installation, and further has not made economical use of the insulating material. It is therefore desirable to provide a stator design in which a single insulating member not only separates the running and starting winding coils, but also provides insulation for the between-coil connections and the external lead connections.

An object of this invention is to provide an improved dynamoelectric machine stator member having a plurality of windings wherein a single insulating member not only separates the winding end turns, but also insulates the between-coil connections and the external lead connections.

Further objects and advantages of this invention will become apparent and the invention will be better understood by reference to the following description and the accompanying drawing, and the features of novelty which characterize this invention will be pointed out with particularity in the claims annexed to and forming a part of this specification.

In accordance with this invention, there is provided a core having a plurality of winding slots formed therein with a first winding arranged in the slots and having end turns extending therefrom, and a second winding arranged in the slots over the first winding and also having end turns extending therefrom. In order to insulate the end turns of the first winding from the end turns of the second winding, an annular member formed of insulating material having a V-shaped cross section is arranged between the first and second winding end turns with the apex thereof toward the core. The connections between the various coils comprising the windings and between the windings and the external leads are positioned in the V of the annular insulating member. In accordance with the preferred embodiment of this invention, the annular insulating member is provided with a plurality of projections extending therefrom, these projections being folded back so that the ends thereof are within the V of the annular member and enclosing the between-coil and external lead connections. The preferred embodiment of this invention further provides a lead board formed of insulating material having openings formed therein to receive the external leads, the lead board being arranged overlapping a portion of the outer edge of the annular insulating member and having its outer edge in turn folded back into the V of the insulating member. The preferred embodiment is completed by another annular member formed of insulating material having a frusto-conical configuration arranged between the first and second winding end turns on the side of the core remote from the first annular insulating member and the connections, this member engaging the inner surface of the first winding end turns.

Referring now to the drawings, Fig. 1 is a side elevational view showing a stator member for a single phase alternating current motor provided with the improved construction of this invention; Fig. 2 is an enlarged cross sectional view taken along the line 2—2 of Fig. 1; Fig. 3 is an enlarged fragmentary cross sectional view of the annular between end turn insulating ring taken along the line 3—3 of Fig. 1; Fig. 4 shows a development of the annular insulating ring prior to its installation; Fig. 5 is a development of the annular insulating ring utilized at the end of the core remote from the ring of Fig. 4; Fig. 6 shows the frusto-conical configuration of the ring of Fig. 5; Fig. 7 shows the lead board which is associated with the annular insulating ring of Fig. 4; and Figs. 8 to 12 inclusive illustrate modifications of this invention.

Referring now to Fig. 1, there is shown a stator member 1 for a single phase alternating current motor having a core member 2 formed of a plurality of relatively thin laminations of magnetic material. The core member 2 is provided with a plurality of evenly spaced winding slots 3 formed in its periphery and facing radially inward. The winding slots 3 are insulated by suitable slot liners 4 formed of insulating material, and coils 5 comprising running winding 6 are positioned in the slots as shown. The coils 5 of the running winding 6 have end turns 7 and 8 extending respectively on either side of the core 2. In addition to the coils 5 of the running winding 6, coils 8 of starting winding 9 are also positioned in the winding slots 3 over the running winding coils 5. End turns 10 and 11 of coils 8 of starting winding 9 also respectively project on either side of the stator core 2. The windings are held in place in the winding slots 3 by means of suitable slot wedges 12 and the running and starting windings 6 and 9 are separated within the slots 3 by suitable slot separators shown at 13 in Fig. 2.

In order to separate the end turns of the running and starting winding coils, and also to insulate the between-coil connections and the external lead connections, an annular ring 14 formed of insulating material is provided. This ring has a V-shaped configuration when positioned between the end turns 7 of the running winding 6 and the end turns 10 of the starting winding 9, as shown in Fig. 2. The main body portion of the annular insulating member 14, which comprises sides 15 and 16, is provided with a plurality of openings 17 adjacent the apex 18 of the V through which the various coil ends 19 extend. The connections between various coil ends 19, as at 20, are positioned within the V of the annular insulating member 14, as shown in Fig. 2, thus eliminating the requirement for separate insulation for these connections. Other of the coil ends 19 are connected to external leads 21, as at 22, and these connections are also positioned within the V of the annular insulating member 14.

In order to further protect the between-coil and between-winding connections 20 and 22 positioned in the V of the insulating member 14, the side 15 of the insulating member 14 is provided with projections 23 at its outer edge, these projections being folded back so that their ends are within the V of the insulating member 14, as shown in Fig. 2. A lead board 25 is provided having openings 25 to receive the leads 21. This lead board 24 is formed of insulating material and is arranged overlapping the outer edge of the side 15 of the annular insulating member 14, as shown in Fig. 4. The lead board 24 also extends outwardly from the side 15 of the annular insulating member 14 and its outer end 26 is also folded back into the V of the annular insulating member 14 as shown in Fig. 3. A slit 27 is provided in the side 16 of the annular insulating member 14 in order to relieve the buckling tendency of the insulation at this point. The two sides adjacent the slit 27 fold over each other as the ring is formed, thus giving a smooth contour.

It will now be seen that the improved V-shaped annular insulating member 14 separates the end turns 7 and 10 of the running winding 6 and the starting winding 9 in order to prevent shorts between the windings. Furthermore, since the between-coil and external lead connections are placed inside the natural V formed by the annular insulating member 14, these lead and inter-coil connections are insulated, and further insulation is unnecessary. The use of this improved insulating member also eliminates the necessity for utilizing stockinette, since the lead wires and inter-coil wires are threaded through holes in the annular insulating member 14 at the point where these wires emerge from the stator slots, and these wires thus lie inside the V and do not require additional insulation. It will also be readily seen that the annular insulating member 14 holds the lead board 24 in position during the subsequent tying of the end turns.

In order to separate the end turns 8 and 11 of the running winding 6 and the starting winding 9, a second insulating member 28 is provided as shown in Figs. 5 and 6. Member 28, when assembled into a ring, as shown in Fig. 6, has a frustro-conical configuration and engages the inner surface of the end turns 8 of the running winding 6. This ring is inserted between the running and starting winding end turns in such a manner that the slot separators 13 will be next to the starting winding end turns 11, and the annular member 28 is so formed that when it is assembled into a ring, the resultant frustro-conical configuration is slightly more exaggerated than the natural cone shape between the running and starting winding end turns 8 and 11. This exaggerated cone shape holds the insulating member 28 in position during subsequent end turn tying operations.

It will be readily understood that numerous minor modifications can be made without departing from the essence of this invention. For example, the projections 23 of the annular member 14 may be folded on the outside of the V, as shown in Fig. 8, rather than on the inside as shown in Fig. 3. Also, the lead board 24 shown in Figs. 4 and 7 may be formed as an integral part of the annular member 14, as shown in Fig. 9, rather than as a separate member as shown in Fig. 4. The annular member 14 itself may be made in two pieces 29 and 30, as shown in Fig. 10, rather than one as shown, these two pieces forming the two sides of the V when installed between the end turns 7 and 10 as shown in Fig. 2. It will also be understood that the cross sectional configuration of the annular member 14 may be U-shaped, as shown in Fig. 11, rather than V-shaped as shown in Figs. 2 and 3. It may be found permissible to utilize an annular member 14 which completes only a portion of a complete circle rather than the entire ring as shown in Fig. 12. Furthermore, the openings 17 shown in Fig. 4 need not be near the apex of the V as shown in Fig. 4, and slots extending to the edge of the member may be utilized rather than the holes shown. It will be readily understood, of course, that this type of insulation may be equally applied to a motor wherein the winding is on the rotor rather than on the stator as shown in Fig. 1.

It will now be readily apparent that this improved construction provides insulation between the end turns of the machine and also insulates the between-coil and external lead connections for the machine with only two pieces of insulation, where at least four were formerly required. Furthermore, assembly of the insulation is facilitated by reduction of the parts, thus effecting a cost reduction in the assembly of the machine and considerable material saving is also effected. In addition, this construction permits the lead connections to be made closer to the point where the leads emerge from the lead board.

While I have illustrated and described a particular form of this invention, further modifications and improvements will occur to those skilled in the art. I desire it to be understood, therefore, that this invention is not limited to the embodiments shown and I intend in the appended claims to cover all modifications which do not depart from the spirit and scope of this invention.

What I claim as new and desire to secure by Letters Patent of the United States is:

1. A member for a dynamoelectric machine comprising a core having a plurality of winding slots formed therein, a first winding arranged in said slots and having end turns extending beyond said core, a second winding arranged in said slots over said first winding and having end turns extending beyond said core, and an annular member formed of insulating material having a substantially V-shaped cross section arranged between said first and second winding end turns for separating and insulating said first winding end turns from said second winding end turns.

2. A member for a dynamoelectric machine comprising a core having a plurality of winding slots formed therein, a first winding arranged in said slots and having end turns extending beyond said core, a second winding arranged in said slots over said first winding and having end turns extending beyond said core, and an annular member formed of insulating material having a substantially V-shaped cross section arranged between said first and second end turns with the apex thereof toward said core for separating and insulating said first winding end turns from said second winding turns, said stator member having a plurality of external leads, said first and second windings having certain coil ends connected together and other coil ends connected to said external leads, said connections being positioned within the V of said annular member.

3. A member for a dynamoelectric machine comprising a core having a plurality of winding slots formed therein, a first winding having a plurality of coils arranged in said slots and having end turns extending beyond said core, a second winding having a plurality of coils arranged in said slots over said first winding coils and having end turns extending beyond said core, and an annular member formed of insulating material having a substantially V-shaped cross section arranged between said first and second winding end turns with the apex thereof toward said core for separating and insulating said first and second winding end turns, said stator member having a plurality of external leads, said first and second winding coils having certain coil ends connected together and other coil ends connected to said external leads, said connections being positioned within the V of said annular member.

4. A member for a dynamoelectric machine comprising a core having a plurality of winding slots formed therein, a first winding having a plurality of coils arranged in said slots and having end turns extending beyond said core, a second winding having a plurality of coils arranged in said slots over said first winding coils and having end turns extending beyond said core, an annular member formed of insulating material having a substantially V-shaped cross section arranged between said first and second winding end turns with the apex thereof toward said core for separating and insulating said first winding end turns from said second winding end turns, said stator member having a plurality of external leads, said first and second winding coils having certain coil ends connected together and other coil ends connected to said external leads, said connections being positioned within the V of said annular member, said annular member having a plurality of projections extending therefrom, said projections being folded back so that the ends thereof are within the V of said annular member, said projections enclosing at least some of said connections.

5. A member for a dynamoelectric machine comprising a core having a plurality of winding slots formed therein, a first winding arranged in said slots and having end turns extending beyond said core, a second winding arranged in said slots over said first winding and having end turns extending beyond said core, an annular member formed of insulating material having a substantially V-shaped cross section arranged between said first and second winding end turns with the apex thereof toward said core for separating and insulating said first winding end turns from said second winding end turns, said stator member having a plurality of external leads, said first and second windings having certain coil ends connected together and other coil ends connected to said external leads, said connections being positioned within the V of said annular member, and a lead board formed of insulating material and having a plurality of openings formed therein to receive said external leads, said lead board being arranged overlapping a portion of the outer edge of one side of said annular member, the outer edge of said lead board being folded back within said V of said annular member.

6. A member for a dynamoelectric machine comprising a core having a plurality of winding slots formed therein, a first winding arranged in said slots and having end turns extending beyond said core, a second winding arranged in said slots over said first winding and having end turns extending beyond said core, an annular member formed of insulating material having a substantially V-shaped cross section arranged between said first and second winding end turns with the apex thereof toward said core for separating and insulating said first winding end turns from said second winding end turns, said stator member having a plurality of external leads, said first and second windings having certain coil ends connected together and other coil ends connected to said external leads, said connections being positioned within the V of said annular member, said annular member having a plurality of projections extending therefrom, said projections being folded back so the ends thereof are within the V of said annular member, said projections enclosing at least some of said connections, and a lead board formed of insulating material and having a plurality of openings formed therein to receive said external leads, said lead board being arranged overlapping a portion of the outer edge of one side of said annular member, the outer edge of said lead board being folded back within said V of said annular member.

7. A member for a dynamoelectric machine comprising a core having a plurality of winding slots formed therein, a first winding arranged in said slots and having end turns extending beyond both sides of said core, a second winding arranged in said slots over said first winding and having end turns extending beyond both sides of said core, an annular member formed of insulating material having a substantially V-shaped cross section arranged between said first and second winding end turns on one side of said core for separating and insulating said first winding end turns from said second winding end turns, and another annular member formed of insulating material having a frustro-conical configuration arranged between said first and second winding end turns on the other side of said core.

8. A member for a dynamoelectric machine comprising a core having a plurality of winding slots formed therein, a first winding arranged in said slots and having end turns extending beyond both sides of said core, a second winding arranged in said slots over said first winding and having end turns extending beyond both sides of said core, an annular member formed of insulating material having a substantially V-shaped cross section arranged between said first and second winding end turns on one side of said core with the apex thereof toward said core for separating and insulating said first winding end turns from said second winding end turns, said stator member having a plurality of external leads, said first and second windings having certain coil ends connected together and other coil ends connected to said external leads, said connections being positioned within the V of said annular member, and another annular member formed of insulating material having a frustro-conical configuration arranged between said first and second winding end turns on the other side of said core and engaging the inner surface of said first winding end turns.

9. A member for a dynamoelectric machine comprising a core having a plurality of winding slots formed therein, a first winding arranged in said slots and having end turns extending beyond both sides of said core, a second winding arranged in said slots over said first winding and having end turns extending beyond both sides of said core, an annular member formed of insulating material having a substantially V-shaped cross section arranged between said first and second winding end turns on one side of said core with the apex thereof toward said core for separating and insulating said first winding end turns from said second winding end turns, said stator member having a plurality of external leads, said first and second windings having certain coil ends connected together and other coil ends connected to said external leads, said connections being positioned within the V of said annular member, said annular member having a plurality of projections extending therefrom, said projections being folded back so that the ends thereof are within the V of said annular member, said projections enclosing at least some of said connections, and another annular member formed of insulating material having a frustro-conical configuration arranged between said first and second winding end turns on the other side of said core and engaging the inner surface of said first winding end turns.

10. A member for a dynamoelectric machine comprising a core having a plurality of winding slots formed therein, a first winding arranged in said slots and having end turns extending beyond both sides of said core, a second winding arranged in said slots over said first winding and having end turns extending beyond both sides of said core, an annular member formed of insulating material having a substantially V-shaped cross section arranged between said first and second winding end turns on one side of said core with the apex thereof toward said core for separating and insulating said first winding end turns from said second winding end turns, said stator member having a plurality of external leads, said first and second windings having certain coil ends connected together and other coil ends connected to said external leads, said connections being positioned within the V of said annular member, said annular member having a plurality of projections extending therefrom, said projections being folded back so that the ends thereof are within the V of said annular member, said projections enclosing at least some of said connections, a lead board formed of insulating material and having a plurality of openings formed therein to receive said external leads, said lead board being arranged overlapping a portion of the outer edge of one side of said annular member, the outer edge of said lead board being folded back within said V of said annular member, and another annular member formed of insulating material having a frustro-conical configuration arranged between said first and second winding end turns on the other side of said board engaging the inner surface of said first winding end turns.

11. A member for a dynamoelectric machine comprising a core having a plurality of winding slots formed therein, a first winding arranged in said slots and having end turns extending beyond said core, a second winding arranged in said slots over said first winding and having end turns extending beyond said core, and an annular member formed of insulating material having a substantially V-shaped cross section arranged between said first and second winding end turns for separating and insulating said first winding end turns from said second winding end turns, said stator member having a plurality of external leads, said first and second windings having certain coil ends connected together and other coil ends connected to said external leads, said annular member having openings formed therein for receiving said coil ends, said connections being positioned within the V of said annular member.

12. A member for a dynamoelectric machine comprising a core having a plurality of winding slots formed therein, a first winding arranged in said slots and having end turns extending beyond said core, a second winding arranged in said slots over said first winding and having end turns extending beyond said core, and an annular member formed of insulating material having a substantially V-shaped cross section arranged between said first and second winding end turns with the apex thereof toward said core for separating and insulating said first winding end turns from said second winding end turns, said first and second windings having certain coil ends connected together, said connections being positioned within the V of said annular member.

HOWARD A. SCHULTZ.

No references cited.